US010097018B2

United States Patent
Park et al.

(10) Patent No.: US 10,097,018 B2
(45) Date of Patent: Oct. 9, 2018

(54) APPARATUS AND METHOD FOR DISPLAYING STATE OF TERMINAL CAPABLE OF COMMUNICATION AND ELECTRIC CHARGING

(71) Applicant: LG INNOTEK CO., LTD., Seoul (KR)

(72) Inventors: Dong Chan Park, Seoul (KR); Do Youb Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 736 days.

(21) Appl. No.: 13/903,732

(22) Filed: May 28, 2013

(65) Prior Publication Data

US 2013/0335037 A1   Dec. 19, 2013

(30) Foreign Application Priority Data

May 25, 2012  (KR) .................. 10-2012-0056360

(51) Int. Cl.
*H02J 7/00* (2006.01)
*H04B 5/00* (2006.01)
*H04M 1/02* (2006.01)

(52) U.S. Cl.
CPC .......... *H02J 7/0047* (2013.01); *H02J 7/0004* (2013.01); *H02J 7/0044* (2013.01); *H04B 5/00* (2013.01); *H04M 1/0283* (2013.01); *Y02B 40/90* (2013.01)

(58) Field of Classification Search
CPC ........ H04B 5/00; H02J 7/0047; H04M 1/0283
USPC ....................................................... 320/114
See application file for complete search history.

(56) References Cited

U.S. PATENT DOCUMENTS

| 6,751,484 | B1 * | 6/2004 | Sandelius | H04M 1/22 455/226.1 |
| 2007/0220427 | A1 | 9/2007 | Briancon et al. | |
| 2009/0058353 | A1 * | 3/2009 | Jung | H01M 10/46 320/101 |
| 2009/0146608 | A1 * | 6/2009 | Lee | H02J 7/025 320/108 |
| 2009/0156268 | A1 | 6/2009 | Kim et al. | |
| 2009/0231248 | A1 * | 9/2009 | Dorff | H04M 1/0283 345/83 |

(Continued)

FOREIGN PATENT DOCUMENTS

CN   201699760 U   1/2011
DE   20-2004-020050 U1   6/2006

(Continued)

OTHER PUBLICATIONS

European Search Report dated Sep. 17, 2013 in European Application No. 13168766.7.

(Continued)

*Primary Examiner* — Richard Isla Rodas
*Assistant Examiner* — Manuel Hernandez
(74) *Attorney, Agent, or Firm* — Saliwanchik, Lloyd & Eisenschenk

(57) ABSTRACT

A device and a method are provided. In a terminal capable of at least one of a wireless charging function and a near field communication (NFC) function, the device displays operation states of the functions via an e-skin unit. Wireless charging efficiency, a charging state, and a communication state may be selectively or totally displayed to a user.

2 Claims, 4 Drawing Sheets

(56) References Cited

U.S. PATENT DOCUMENTS

| | | | |
|---|---|---|---|
| 2011/0117955 A1* | 5/2011 | Lee | H04M 1/72569 |
| | | | 455/550.1 |
| 2011/0124383 A1 | 5/2011 | Garra et al. | |
| 2011/0148343 A1* | 6/2011 | Lee | H01M 10/465 |
| | | | 320/101 |
| 2012/0220219 A1* | 8/2012 | Hill | G06K 19/0776 |
| | | | 455/41.1 |
| 2013/0038278 A1* | 2/2013 | Park | H02J 7/00 |
| | | | 320/108 |
| 2013/0231818 A1* | 9/2013 | Saito | B60L 11/184 |
| | | | 701/22 |
| 2014/0203770 A1* | 7/2014 | Salter | H02J 7/0047 |
| | | | 320/108 |
| 2016/0374049 A1* | 12/2016 | Ha | H02J 7/025 |

FOREIGN PATENT DOCUMENTS

| | | | |
|---|---|---|---|
| EP | 2071695 A2 | 6/2009 | |
| JP | 3080147 U | 6/2001 | |
| WO | WO-2006/067560 A1 | 6/2006 | |
| WO | WO 2007/089819 | 8/2007 | |
| WO | WO 2011/062703 A2 | 5/2011 | |

OTHER PUBLICATIONS

European Search Report dated Dec. 3, 2015 in European Application No. 13168766.7.

* cited by examiner

| CHARING EFFICIENCY | E-Skin Color | |
|---|---|---|
| 70% OR MORE | BLUE | ~401 |
| 40%~70% | GREEN | ~403 |
| 40% OR LESS | YELLOW | ~405 |

| CHARGING STATE | E-Skin Color | |
|---|---|---|
| 4.0V | BLUE | ~501 |
| 2.5V~4.0V | GREEN | ~503 |
| 2.5% OR LESS | YELLOW | ~505 |

| NFC STATE | E-Skin Color | |
|---|---|---|
| 90% OR MORE | BLUE | ~601 |
| 50%~90% | GREEN | ~603 |
| 50% OR LESS | YELLOW | ~605 |

APPARATUS AND METHOD FOR DISPLAYING STATE OF TERMINAL CAPABLE OF COMMUNICATION AND ELECTRIC CHARGING

CROSS-REFERENCE TO RELATED APPLICATION

This application claims the benefit under 35 U.S.C. § 119 to Korean Patent Application No. 10-2012-0056360, filed on May 25, 2012, which is hereby incorporated by reference in its entirety.

BACKGROUND

The present disclosure relates to a device and a method for displaying, in a terminal featuring at least one of a wireless charging function and a communication function, an operation state of the function via an e-skin comprising a visual indication.

FIG. 1 is a view illustrating a typical terminal featuring a charging function 103.

As shown in FIG. 1, a typical wireless charger of a cellular phone is built in a general case and performs a wireless charging function. Accordingly, since it is needed to check a sound or a state by executing an internal program of the cellular phone to check a wireless charge state and wireless charging efficiency, which is inconvenient and difficult to be checked immediately.

BRIEF SUMMARY

Embodiments provide displaying an operation state of a terminal device via an e-skin.

Embodiments also provide a device and a method for displaying, in a terminal featuring at least one of wireless charging function and a near field communication (NFC), operation states of the functions via an e-skin unit.

Embodiments also provide a device and a method for displaying, in a terminal capable of wireless charge, charging efficiency, a charging state, and/or a residual amount of a battery by adding a color-variable e-skin function.

Embodiments also provide a device and a method for displaying, in a terminal capable of communication including an NFC, a communication state via an e-skin unit.

Embodiments also provide a device and a method for displaying, in a terminal capable of a wireless communication function and an NFC function, charging efficiency, a charging state, and a residual amount of a battery via an e-skin unit.

Embodiments also provide a device and a method for allowing a user, by applying a color-variable e-skin unit to a rear case or a battery cover where a wireless charging function and an NFC function are built in, to check wireless charging efficiency, a charging state of wireless charge, and a state of an NFC via a variation of color of the e-skin unit.

In one embodiment, device for displaying a state of a terminal capable of communication and electric charge includes a communication unit, a charging unit, an output unit displaying the state of the terminal, an input unit for inputting a user command to display at least one of charging state information and charging efficiency information of the charging unit and communication state information of the communication unit by using the output unit, a memory unit, to allow the at least one of charging state information, charging efficiency information, and communication state information to be displayed differently in accordance with an operation state, storing color information corresponding to the operation state, and a control unit controlling the units.

The details of one or more embodiments are set forth in the accompanying drawings and the description below. Other features will be apparent from the description and drawings, and from the claims.

BRIEF DESCRIPTION OF THE DRAWINGS

FIG. 5 is a view illustrating a table in which there are a charging state and e-skin color information corresponding thereto when performing charge by the components for wireless charge in FIGS. 2 and 3 stored in the memory unit.

FIG. 6 is a view illustrating a table in which there are a communication state and e-skin color information corresponding thereto when performing a communication by the components for an NFC in FIGS. 2 and 3 stored in the memory unit.

DETAILED DESCRIPTION

Hereinafter, there will be described a device and a method of displaying an operation state of a terminal via an e-skin in detail with reference to the attached drawings.

Terms used in the embodiments generally used now as possible are selected. However, there are terms arbitrarily selected by applicants in a particular case, the terms of which operation and meaning are disclosed in detail in a corresponding description. Accordingly, the terms should be understood from operation/meaning thereof instead of a simple designation thereof.

In the description, a terminal includes all devices capable of transmitting and/or receiving data via a communication network.

Also, in the description, an input unit indicates means for inputting a user command and includes all direct inputs and wired/wireless inputs.

Also, in the description, being linked, being connected, or being in contact with indicates not only a case of being directly connected but also a case of being mechanically connected via another component, another medium, or another device, being electrically connected, or being wired/wireless connected.

Figure 2:
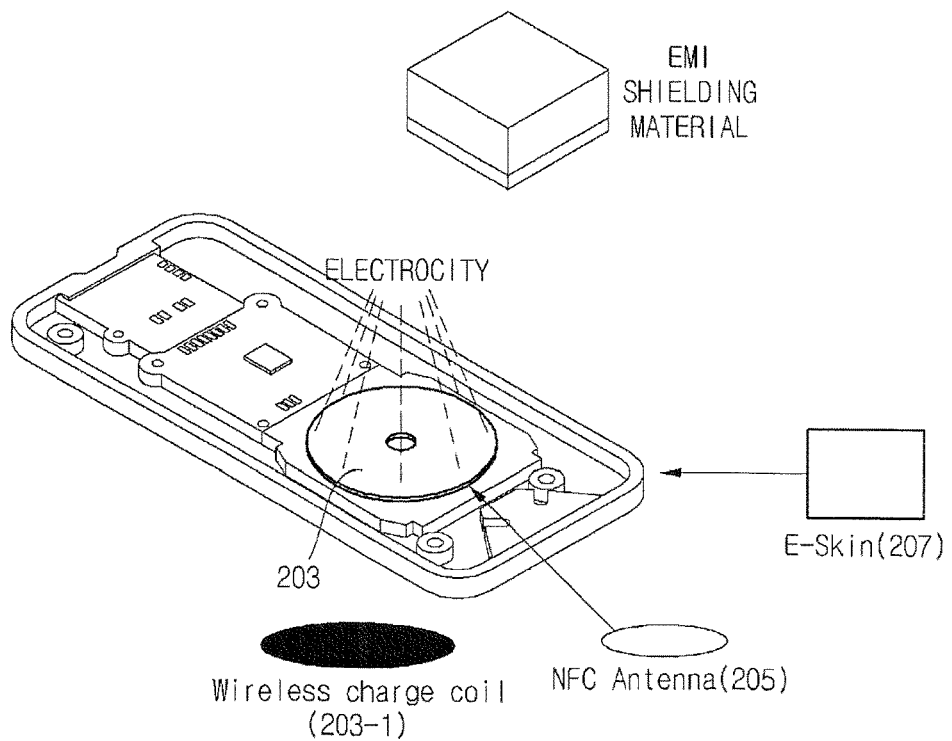
FIG. 2 is a view illustrating a terminal including components for performing a wireless charging function, a near filed communication (NFC) function, and an e-skin function according to an embodiment of the present general inventive concept.

FIG. 2 is a view 200 illustrating a terminal 201 where components 203, 203-1, 205, and 207 for performing a wireless charging function, a near field communication (NFC) function, and an e-skin function are built therein.

Figure 1:
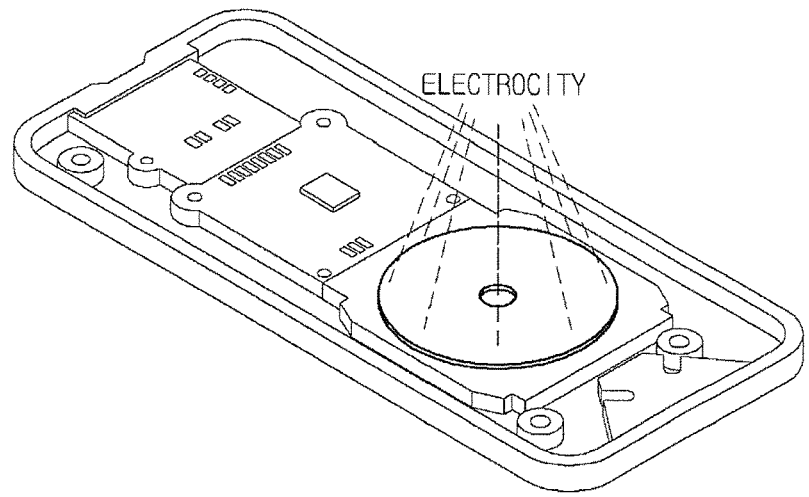
FIG. 1 is a view illustrating a typical terminal with a wireless charging function.

As shown in FIG. 2, to perform the wireless charging function according to the present invention, in addition to a charging unit shown in FIG. 1, the terminal 201 includes a wireless charging coil 203-1 performing the charging function via an organic operation with a primary coil (not shown) formed on a wireless charging pad and an NFC antenna 205 to perform a communication with other devices.

On the other hand, the terminal 201 includes an e-skin unit 207 formed in a location to allow a user to easily check, the e-skin unit 207 for displaying charging efficiency performed by the components for the wireless charging function, a charging state and/or battery residual amount information. The location where the e-skin unit 207 is formed may be different for each terminal but should allow the user to immediately check.

Also, the e-skin unit 207 for displaying a communication state of the NFC antenna 205 is formed on a location of the terminal 201 to be easily checkable. The location where the e-skin unit is formed may be different for each terminal but should allow the user to immediately check.

As an example, the location immediately checkable may be on a rear case or a battery cover of the terminal 201, but not limited thereto, and may be a location easily checkable based on mechanical features.

In the present embodiment, as an example of the communication function, there has been described the NFC function but not limited thereto, there may be used other communication functions such as Bluetooth and Zigbee.

In the embodiment of FIG. 2, the efficiency of wireless charging and an NFC function may be improved by using a high efficiency broad band electromagnetic interference (EMI) shielding material 209 with u>10.

The u value of directivity, directivity is better as the value is higher and worse as the value is lower. Accordingly, there are a large amount of a magnetic field leaks laterally or backwardly when the u value is low. There is formed a magnetic field in one direction to reduce a loss of the magnetic field while charging, thereby quickly charging and improving efficiency.

Typically, an inner configuration of a terminal is like as follows.

The terminal includes a battery cover, an NFC antenna/a wireless charging coil, a shielding material, a circuit unit, a terminal screen, and in accordance with the shielding material, a control unit in such a way that an influence of magnetic field on the circuit unit is prevented and wireless charging and NFC efficiency may be improved.

Figures 3, 4:
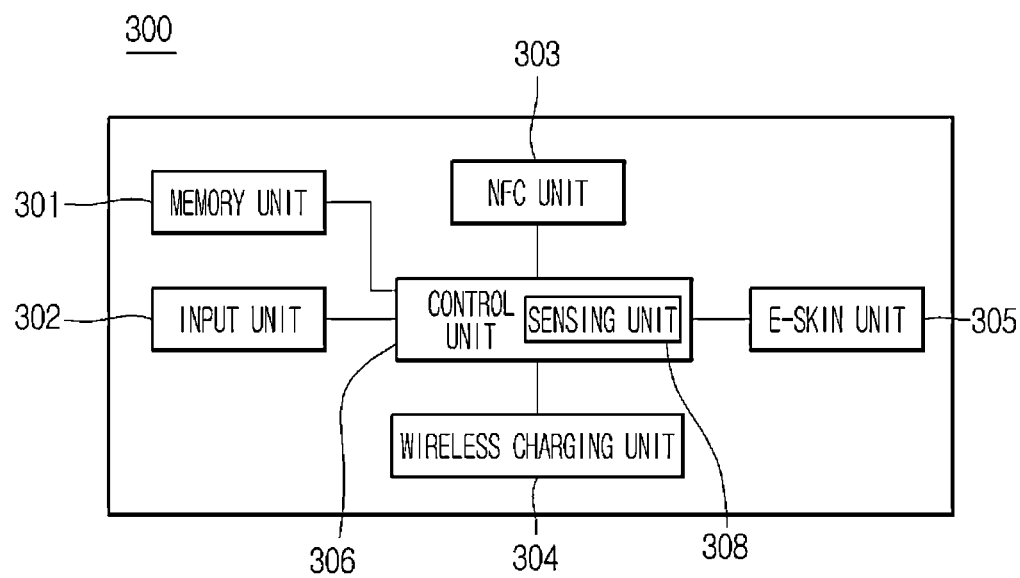
FIG. 3 is a block view illustrating a terminal including respective components for displaying a terminal operation state via an e-skin.
FIG. 4 is a view illustrating a table in which there are charging efficiency and e-skin color information corresponding thereto when performing charge by the components for wireless charge in FIGS. 2 and 3 stored in a memory unit.

FIG. 3 is a block view 300 illustrating respective components for displaying an operation state of a terminal.

As shown in the drawing, there are provided a communication unit such as an NFC unit 303 included in a terminal, a wireless charging unit 304 including receiving/generating a current, an input unit 302 for inputting a user command to display a charging state and charging efficiency of the wireless charging unit 304 and/or a communication state of the NFC unit 303 via a color-variable e-skin unit which is same as a color-variable indication unit 305, a memory unit storing application programs for the respective operations and corresponding information to display the charging state, the charging efficiency and/or the communication state via an output unit, and a control unit 306 controlling the configuration and operation of the terminal.

There may be provided two or more, and particularly, three to five pieces of color information corresponding to charging state information, the charging efficiency state information and/or communication state information. When the number of the information and outputs corresponding to the operation state is 3 to 5, it is possible to more accurately displaying respective state information to the user and to prevent a complication.

As another example, there are provided various numbers of pieces of operation state information such as 3 to 4, 4 to 5, 5 to 6, and 3 to 7.

For example, a case where an operation state is not good (10 to 20%) may be displayed as red.

Also, in FIG. 3, there is further provided a sensing unit 308 sensing at least one of the charging state information, the charging efficiency information, and the communication state information and an operation state thereof.

Via the components as described above, the terminal may transmit/receive data with another device and the control unit 306 controls to allow a communication state thereof to be checked and to display a color in accordance with the communication state and color information corresponding to thereto, previously stored in a memory unit 301, via the e-skin unit or the color-variable indication unit 305.

Also, the terminal may be charged wireless via an operation between a secondary coil (refer to 203-1 in FIG. 2) formed on the wireless charging unit 304 and a primary coil (not shown) formed on a wireless charging pad, and the control unit 306 controls to allow charging efficiency, a charging state and/or residual amount information of a battery to be checked and to display each color information corresponding to the charging efficiency, the charging state and/or the residual amount information of a battery and corresponding colors in accordance therewith via the e-skin unit or the color-variable indication unit 305.

When displaying an operation state via the e-skin unit 305, there is little power consumption. In case of the e-skin, a leakage current thereof is the same level of uA and there is little power consumption though displaying a color. Accordingly, when displaying an operation state (a charging state or efficiency) via the e-skin unit or the color-variable indication unit 305, it is possible to continuously maintain color without power consumption and to directly check the state without pushing a button.

That is, regardless of a power-state of the terminal such as sleep mode, it is possible to display an operation state.

FIG. 4 is a view 400 illustrating an example of a table showing, when performing charge by using the components for wireless charging in FIGS. 2 and 3, charging efficiency and corresponding e-skin color information thereof stored in the memory unit 301.

As shown in FIG. 4, when an operation state of the charging efficiency determined in accordance with a control of the control unit 306 is 70% or more, it will be displayed in blue via the e-skin unit or the color-variable indication unit 305 (401).

Also, when the operation state of charging efficiency that is state information is within a range of 40 to 70%, it will be displayed in green via the e-skin unit or the color-variable indication unit 305 (403).

Also, when the operation state of charging efficiency that is the state information is 40% or less, it will be displayed in yellow via the e-skin or the color-variable indication unit 305 (405).

The table shown in FIG. 4 is just an example and may vary with user settings or a device.

FIG. 5 is a view 500 illustrating a table in which there are a charging state and e-skin color information corresponding thereto when performing charge by the components for wireless charge in FIGS. 2 and 3 stored in the memory unit 301.

As shown in FIG. 5, when a charging operation state determined in accordance with a control of the control unit 306 is 4.0 V or more, it will be displayed in blue via the e-skin unit or the color-variable indication unit 305 (501).

Also, when the charging operation state is within a range of 2.5 to 4.0 V, it will be displayed in green via the e-skin unit or the color-variable indication unit 305 (503).

Also, the charging operation state is 2.5 V or less, it will be displayed in yellow via the e-skin unit or the color-variable indication unit 305 (505).

The table shown in FIG. 5 is just an example and may vary with user settings and a device.

Also, though a charging state has been described as the example in FIG. 5, a residual amount of a battery may be displayed via the e-skin unit or the color-variable indication unit 305 in accordance with the method described above.

FIG. 6 is a view 600 illustrating a table in which there are a communication state and e-skin color information corresponding thereto when performing a communication by the components for an NFC in FIGS. 2 and 3 stored in the memory unit 301.

As shown in FIG. 6, when a communication operation state quality determined in accordance with a control of the control unit 306 is 90% or more, it will be displayed in blue via the e-skin unit or the color-variable indication unit 305 (601).

Also, when the communication operation state quality is within a range of 50 to 90%, it will be displayed in green via the e-skin unit or the color-variable indication unit 305 (603).

Also, when the communication operation state quality is 50% or less, it will be displayed in yellow via the e-skin unit or the color-variable indication unit 305 (605).

The table in FIG. 6 is just an example and may vary with user settings and a device.

Figure 7:
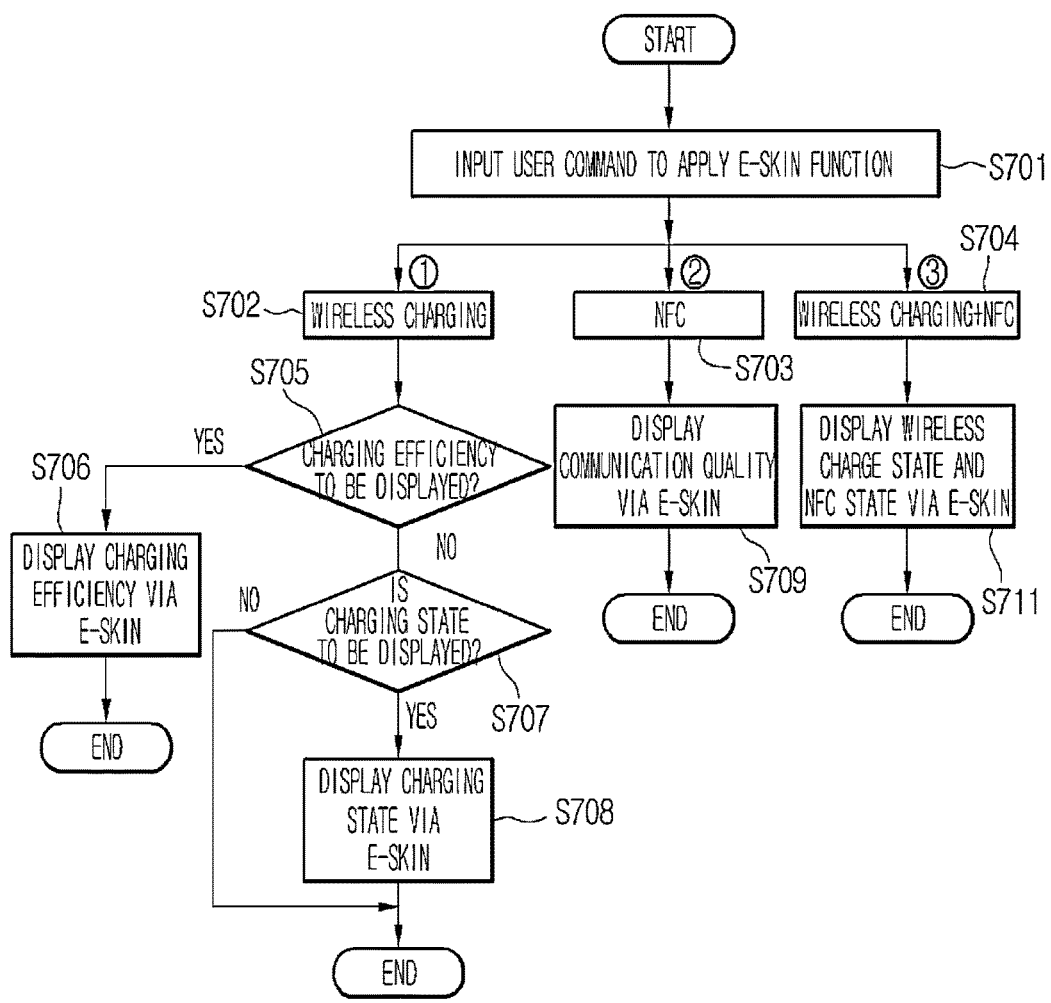
FIG. 7 is a flowchart illustrating a method of setting and executing, by a user, a wireless charging function/a communication function performed via the terminal.

FIG. 7 is a flowchart illustrating a method of setting and executing, by a user, a wireless charging function/a communication function performed via the terminal.

A user command of selecting a function to which the e-skin function is applied is inputted via the input unit 302 (S701).

According to the operation as described above, a user may select respectively as follows.

Wireless charging efficiency/a wireless charging state may be displayed via the e-skin unit or the color-variable indication unit 305 (S702).

A communication state of an NFC may be displayed via the e-skin unit which is same as the color-variable indication unit 305 (S703).

A wireless charging state and a communication state of NFC may be displayed via the e-skin unit which is the color-variable indication unit 305 (S704).

Accordingly, among the respective cases, when selecting S702, an operation according thereto is performed.

For example, when displaying the charging efficiency, the information shown in FIG. 4 is outputted via the e-skin unit, the color-variable indication unit 305 (S705 and S706).

On the other hand, when displaying the charging state, the information shown in FIG. 5 is outputted via the e-skin unit, the color-variable indication unit 305 (S707 and S708).

As another example, among the respective cases, when selecting S703 that is a communication function, an operation according thereto is performed.

For example, when displaying a quality of a communication of an NFC, the information shown in FIG. 6 is outputted via the e-skin unit 30 (S709).

On the other hand, when the user would like to display both the wireless charging state and the communication state of the NFC via the e-skin unit, the color-variable indication unit 305, all the information shown in FIGS. 4, 5, and 6 may be displayed (S711).

The device and the method of displaying the operation state of the terminal according to the present embodiment may be applied to all devices capable of being charged and/or communication, in addition to terminals.

Embodiments allow the user, by applying a color-variable e-skin unit to a terminal where wireless charge and/or an NFC function are built in, to easily check wireless charging efficiency, a charging state of wireless charge, and a state of an NFC via a variation of color of the e-skin unit.

Also, when displaying an operation state by using the e-skin unit, there is little power consumption. In case of the e-skin, a leakage current thereof is the same level of uA and there is little power consumption though displaying a color. Accordingly, when displaying an operation state (a charging state or efficiency) via the e-skin unit, it is possible to continuously maintain color without power consumption and to directly check the state without pushing a button.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
    storing color tables respectively corresponding to each of a communication operation state of a communication unit, a charging operation state, and a charging efficiency of a wireless charging unit;
    receiving a user command of selecting a condition from among communication operation state, the charging operation state, and the charging efficiency;
    checking an operation state of a device corresponding to the selected condition; and
    controlling a color of an e-skin unit of the device according to the checked operation state, wherein the color of the e-skin unit is determined based on the color tables;
    wherein if the selected condition is the communication operation state, the color of the e-skin unit is controlled based on communication quality of the communication unit;
    wherein if the selected condition is the charging operation state, the color of the e-skin unit is controlled based on a charging operation state voltage of the wireless charging unit; and
    wherein if the selected condition is the charging efficiency, the color of the e-skin unit is controlled based on the charging efficiency of the wireless charging unit.

2. A device comprising:
    a communication unit configured to perform communication with other devices;
    a wireless charging unit including a wireless charging coil to charge a battery by power transmitted from a primary coil formed on a wireless charging pad;
    an e-skin unit configured to display a color corresponding to any one of a communication operation state of the communication unit, a charging operation state, and a charging efficiency of the wireless charging unit;

a memory configured to store color tables respectively corresponding to the communication operation state, the charging operation state, and the operation state of the charging efficiency;

an input unit configured to receive a user command of selecting a condition from among the communication operation state, the charging operation state, and the operation state of the charging efficiency; and a control unit configured to check an operation state of the device corresponding to the condition, and to control the color of the e-skin unit according to the checked operation state, wherein the color of the e-skin unit is determined based on the color tables;

wherein if the selected condition is the communication operation state, the control unit is configured to control the color of the e-skin unit based on communication quality of the communication unit;

wherein if the selected condition is the charging operation state, the control unit is configured to control the color of the e-skin unit based on a charging operation state voltage of the wireless charging unit; and wherein if the selected condition is the operation state of the charging efficiency, the control unit is configured to control the color of the e-skin unit based on the charging efficiency of the wireless charging unit.

* * * * *